WITNESSES:
E. A. McCloskey.
W. R. Crout

INVENTOR
Winthrop M. Leeds.
BY
Ralph H. Swingle
ATTORNEY

Sept. 10, 1957

W. M. LEEDS 2,806,110

CIRCUIT INTERRUPTERS

Filed May 26, 1954

6 Sheets-Sheet 4

Sept. 10, 1957 W. M. LEEDS 2,806,110

CIRCUIT INTERRUPTERS

Filed May 26, 1954 6 Sheets-Sheet 5

United States Patent Office 2,806,110

Patented Sept. 10, 1957

2,806,110

CIRCUIT INTERRUPTERS

Winthrop M. Leeds, Pittsburgh, Pa., assignor to Westinghouse Electric Corporation, East Pittsburgh, Pa., a corporation of Pennsylvania Application May 26, 1954, Serial No. 432,466

10 Claims. (Cl. 200—145)

This invention relates to circuit interrupters in general, and, more particularly, to arc-extinguishing structures therefor.

A general object of my invention is to provide an improved circuit interrupter of economical cost and performing in an efficient manner to interrupt currents in the relatively low-current range. A particular field for application of my improved circuit interrupter is that in which capacitor banks are utilized at voltages, say, from 15 to 132 kv. so that power-factor correction may be obtained, together with a raising of the transmission line voltage adjacent the load.

A more specific object of my invention is to provide an improved circuit interrupter involving a plurality of breaks, which will be highly efficient in operation.

Still another object of my invention is to provide a circuit interrupter adaptable to be employed with a gas which may be sealed within the circuit interrupter housing, which gas will assist in arc extinction.

Yet a further object is to provide an improved circuit interrupter in which the interrupter housing may be divided by a baffle plate into two separate chambers whereby the arcs may be established in one chamber and subsequently drawn into the other chamber with a gas flow preferably being forced from the chamber of initial arc-drawing into the other chamber.

A further object of my invention is to provide an improved capacitor switch, of economical cost and highly efficient, which may be used for switching capacitor banks in accordance with the load requirements.

Yet a further object of my invention is to provide an improved circuit interrupter of improved construction, which will be particularly adaptable for use with a relatively expensive gas, such as sulfur hexafluoride, which it is desired to contain within the circuit interrupter housing. In this connection, it is desirable to take full advantage of the remarkable arc-extinguishing properties of sulfur hexafluoride gas.

Still another object of my invention is to provide an improved circuit interrupter in which the contact pressure will be increased during the existence of heavy load currents passing through the interrupter.

Still another object of my invention is to provide an improved circuit interrupter of highly compact construction, in which a plurality of serially related breaks are established, and in which said breaks are brought about in a simple manner by the rotation of substantially a single operating shaft.

Further objects and advantages will readily become apparent upon reading the following specification, taken in conjunction with the drawings, in which.

Figure 12:
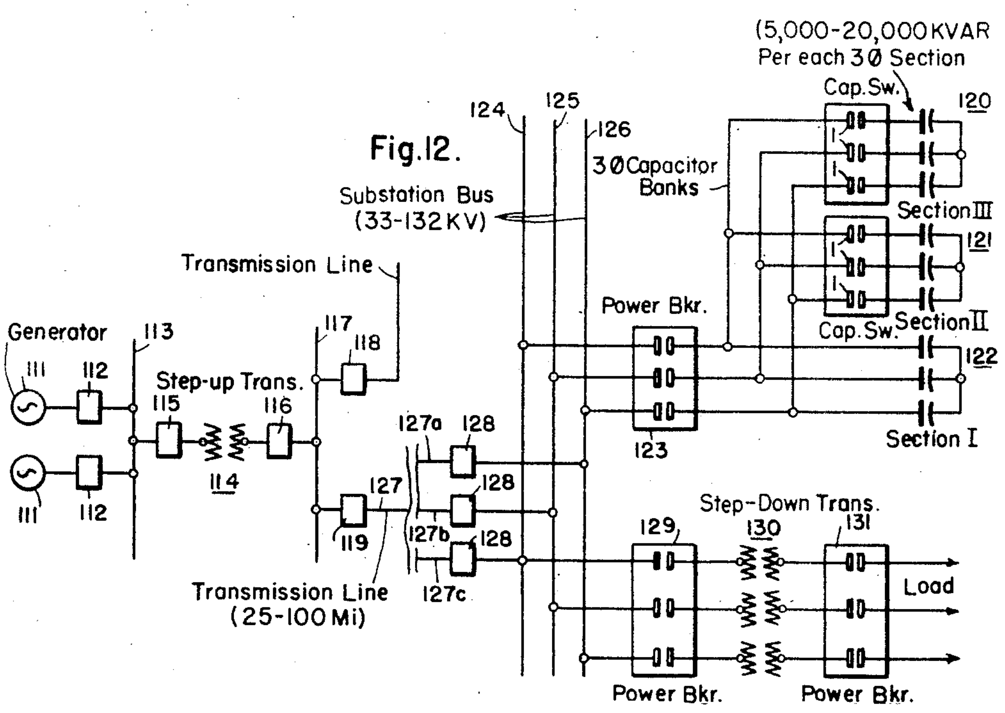
Figure 10:
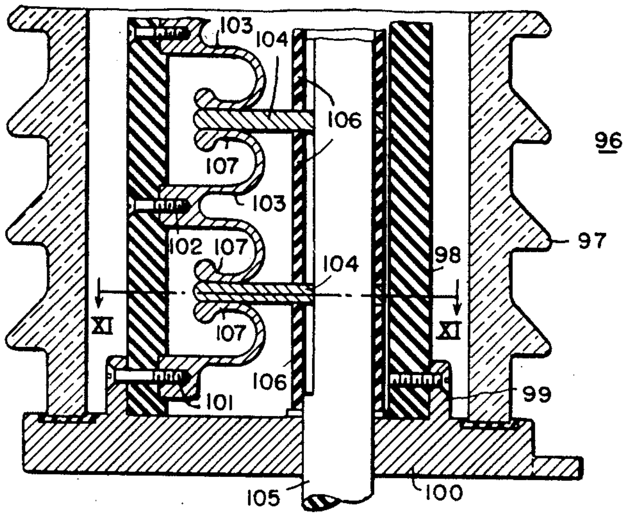
Fig. 10 is an enlarged vertical sectional view, showing fragmentarily a portion of the lower end of a modified type of extinguishing unit, which may be mounted interiorly within the circuit interrupter of Fig. 9 in place of that of Fig. 1, taken substantially along the line X—X of Fig. 11.
Figure 11:
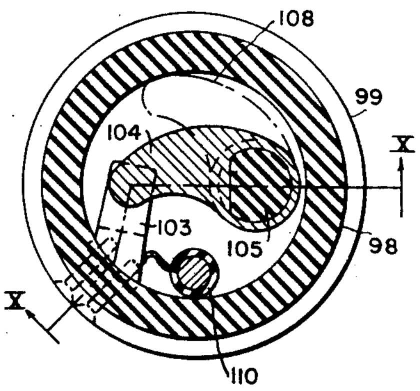

Fig. 11 is a sectional view taken substantially along the line XI—XI of Fig. 10; and Fig. 12 is partly a single line diagram, and partly a three-line diagram of a transmission system utilizing a series of capacitor banks for power factor correction and for voltage regulation, indicating a possible location in the system at which my improved interrupter may be located when used as a capacitor switch.

Figure 1:
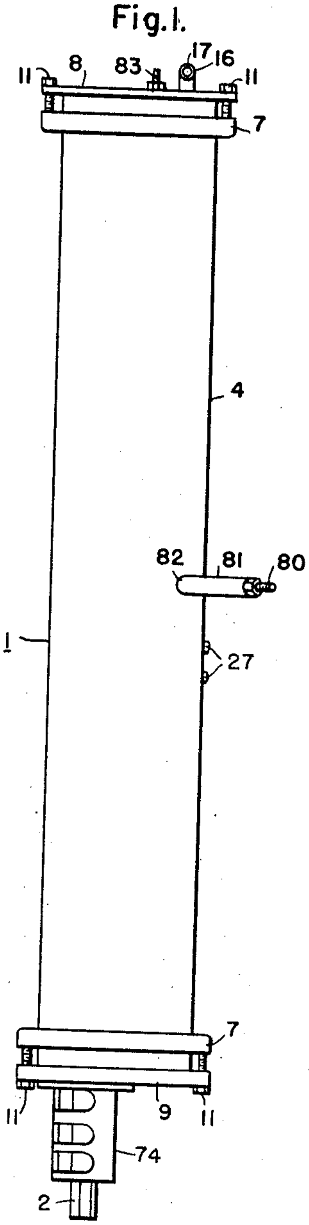
Figure 1 is a side elevational view of the interrupting unit of a circuit interrupter embodying the principles of my invention.

Referring to the drawings, and more particularly to Fig. 1 thereof, the reference numeral 1 generally indicates the arc-extinguishing unit, or interrupting device, of a complete circuit interrupter. The mechanism, not shown, for the circuit interrupter may be operatively connected to the hexagonal operating shaft 2 disposed at the lower end of the interrupting device 1. Since any suitable operating mechanism, either pneumatic or electrical, may be employed, such mechanism has been omitted for simplicity.

It will be noted that generally the interrupting device 1 comprises an insulating cylinder or tube 4 having grooves 5 (Figs. 2 and 2A) formed on its external surface. Metallic rings 6 are placed within the grooves 5 and flange rings 7 are employed to securely hold a cover plate 8 and a base plate 9 in position. As is evident from an inspection of Figs. 2, 2A and 4, the cover plate 8 and the base plate 9 have mounting holes 10 provided therethrough in a circular fashion, through which mounting bolts 11 are disposed, the ends of which are threadedly secured into tapped apertures 12 provided in the flange rings 7. Since a gas is preferably employed interiorly of the cylinder 4, suitable ring-shaped gaskets 13 of a resilient material, such as rubber, or the like, are employed to make a gas-tight engagement between the tube 4 and the plates 8 and 9.

An opening 14 is provided through the upper cover plate 8, and is tapped to receive a nipple 15, which may lead to a T-pipe connection 16. One end of the T connection may connect to a gauge, whereas the other end of the T connection may be provided with a check valve (not shown) and be connected to a source of an arc-extinguishing gas, such as sulfur hexafluoride, so that the cylinder 4 may be filled with such gas under pressure.

Following the filling operation, a pipe plug 17 (Fig. 1) may be employed to close the pipe connection 16.

Figure 5:
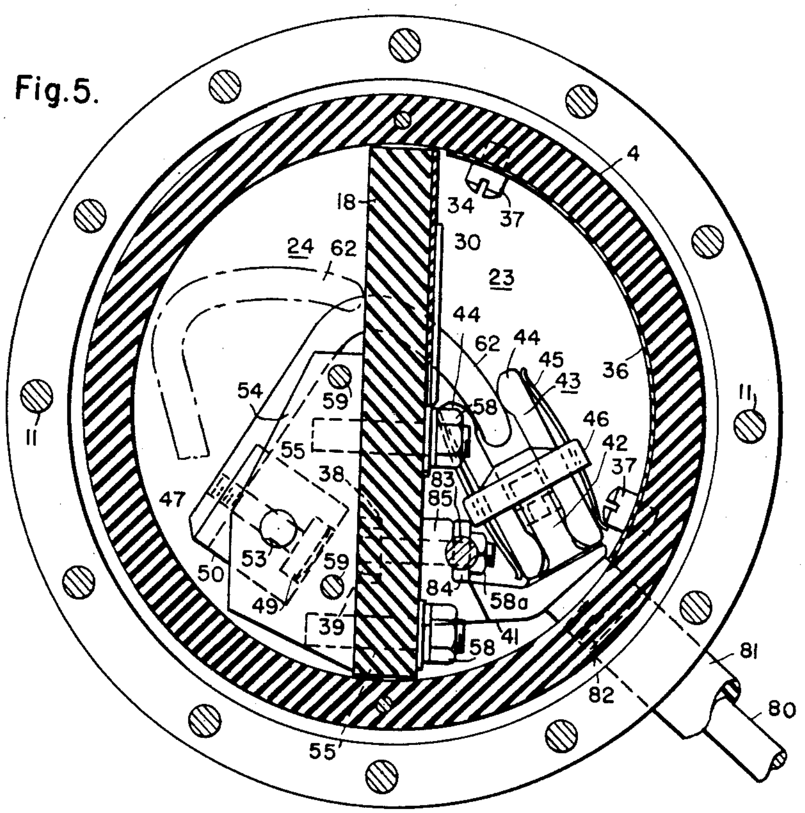
Figs. 5 and 6 are sectional views taken along the lines V—V and VI—VI, respectively, of Fig. 2, looking in the direction of the arrows.
Figure 4:
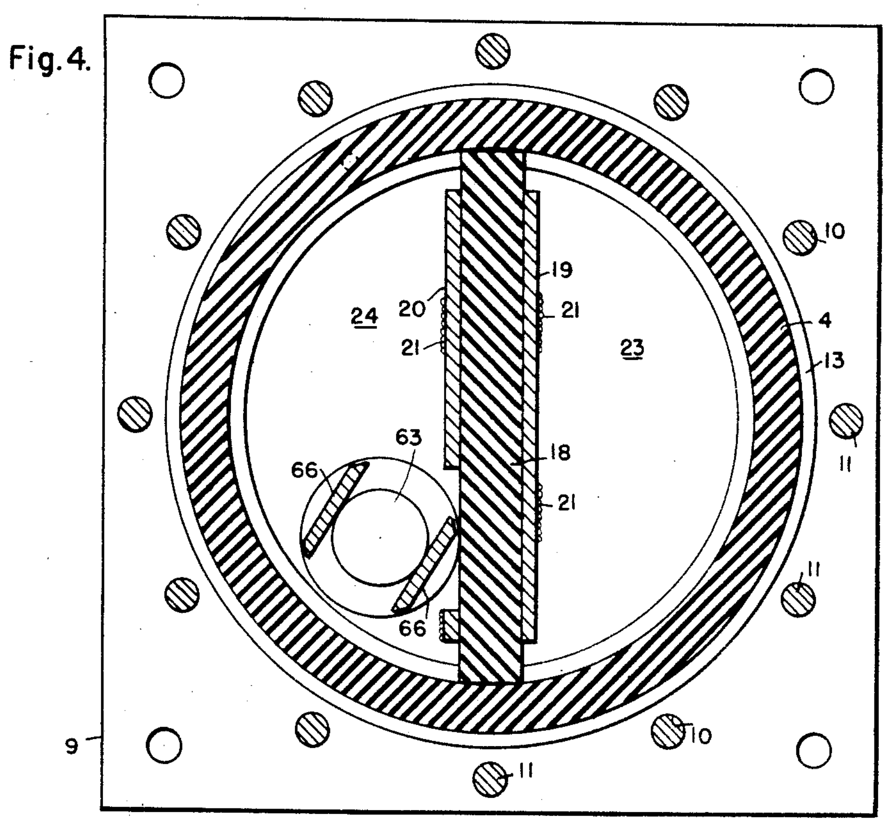
Fig. 4 is a sectional view taken substantially along the line IV—IV of Fig. 2A.

Disposed in a median plane, diametrically across the interior of the cylinder 4, is an insulating barrier plate or baffle 18 as shown more clearly in Figs. 4 and 5. The lower end of the insulating baffle 18 may be guided between a pair of spaced guide brackets 19, 20, which may be welded, as at 21, to the base plate 9. The upper end of the baffle plate 18 may be fixedly secured in position by a pair of steel dowel pins 22 (Fig. 2), which may be welded through the upper cover plate 8 of the interrupter 3.

Figure 6:
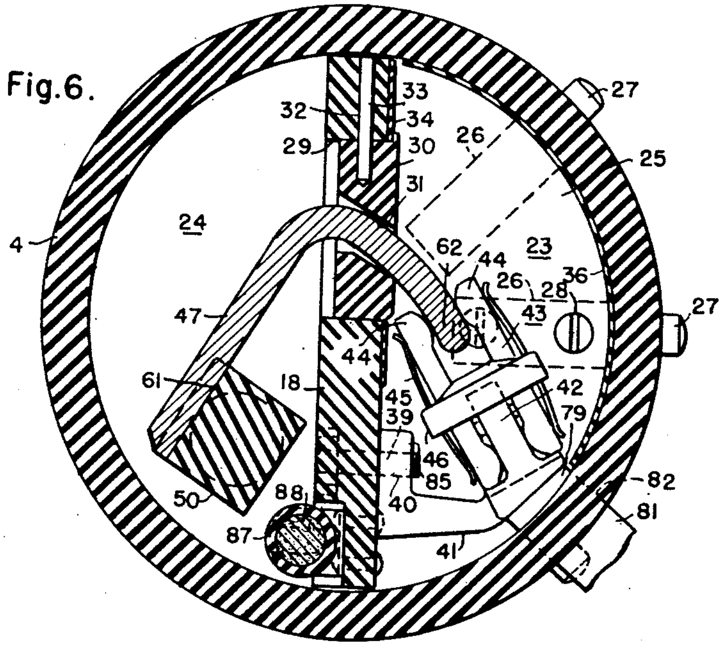

As more clearly apparent from Figs. 4–6, the baffle plate 18 extends entirely across the interior of the cylinder 4 so as to form two separate chambers 23, 24. The arcs are initially established within the pressure chamber 23 and serve to raise the pressure within this chamber. As will be more fully brought out hereinafter, the arcs are drawn through orifices disposed in the baffle plate 18 so that the gas under pressure within chamber 23 may pass through such orifices to thereby bring about arc extinction.

Figure 2:
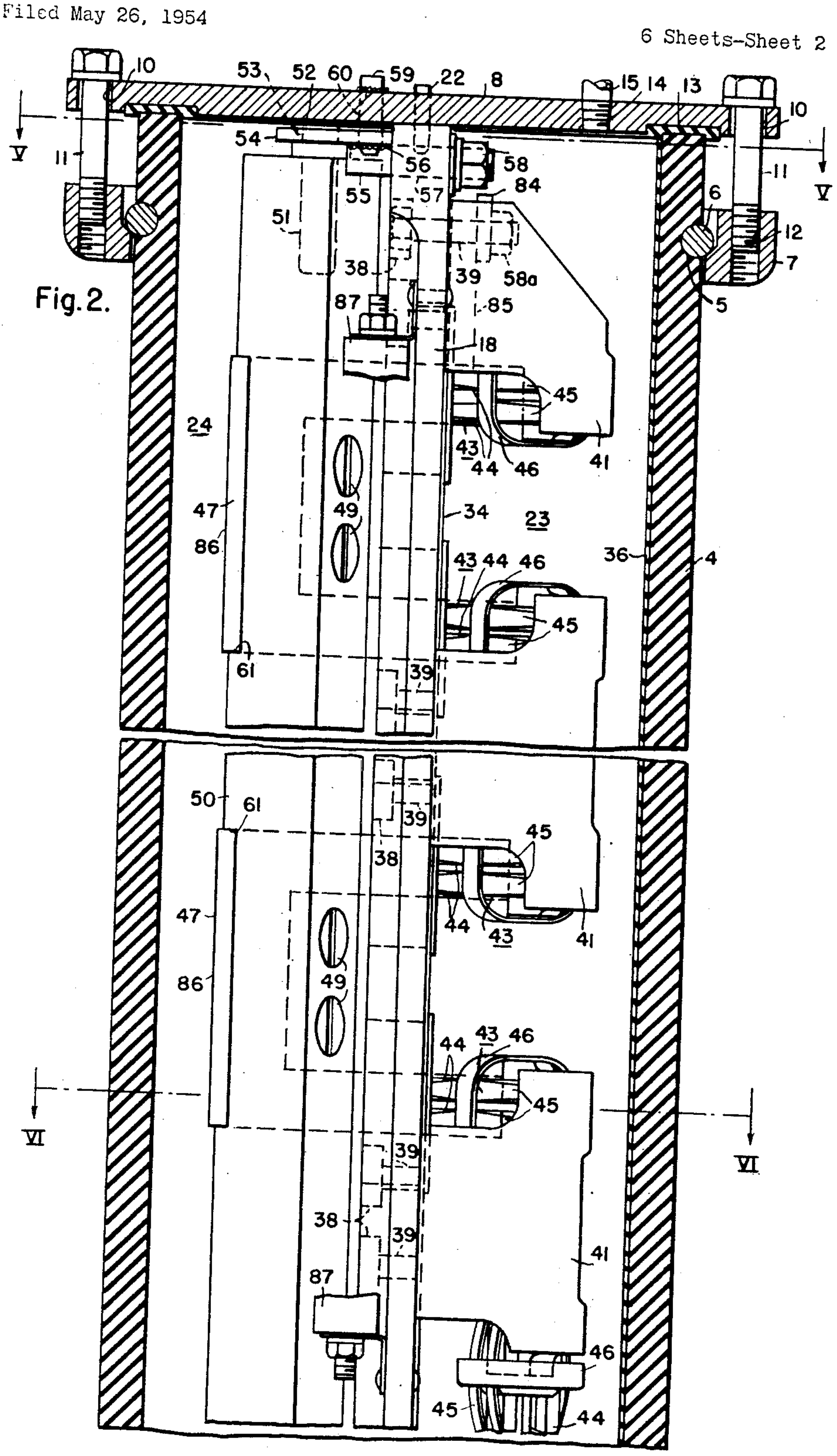
Fig. 2 is an enlarged vertical sectional view, partly broken away, of the upper end of the extinguishing unit shown in Fig. 1, the contact structure being shown in the closed-circuit position.
Figures 2A, 3:
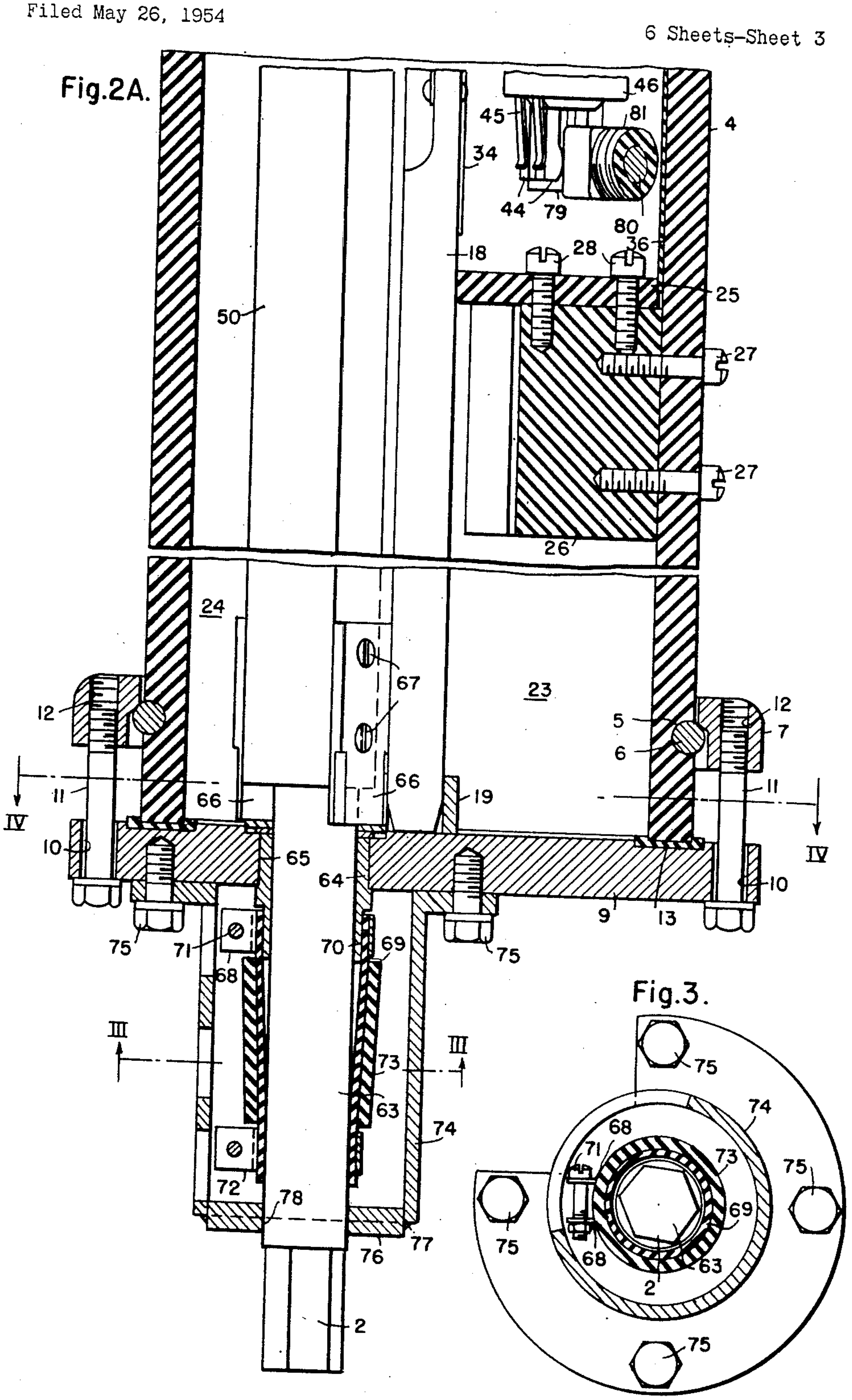
Fig. 2A is a view similar to that of Fig. 2 but showing the lower portion of the extinguishing unit, a portion of the casing being broken away to more clearly show the complete structure, the contact structure again being shown in the closed-circuit position.
Fig. 3 is an inverted plan view taken substantially along the line III—III of Fig. 2A.

The upper end of the pressure chamber 23 is closed by a half portion of the cover plate 8, whereas the lower end of the pressure chamber 23 is closed by a semicircular-shaped plate 25 of insulating material, which is maintained in a fixed position, as more clearly shown in Fig. 2A, by a plurality, in this instance three, insulating brace plates 26. The brace plates 26 are secured to the inner wall of the tube 4 by pairs of mounting bolts 27, and the semicircular-shaped baffle plate 25 is securely fastened to the top sides of the three brace plates 26 by mounting bolts 28. Thus the pressure chamber 23 is substantially enclosed, except for the orifices, which will be hereinafter described.

Figure 8:
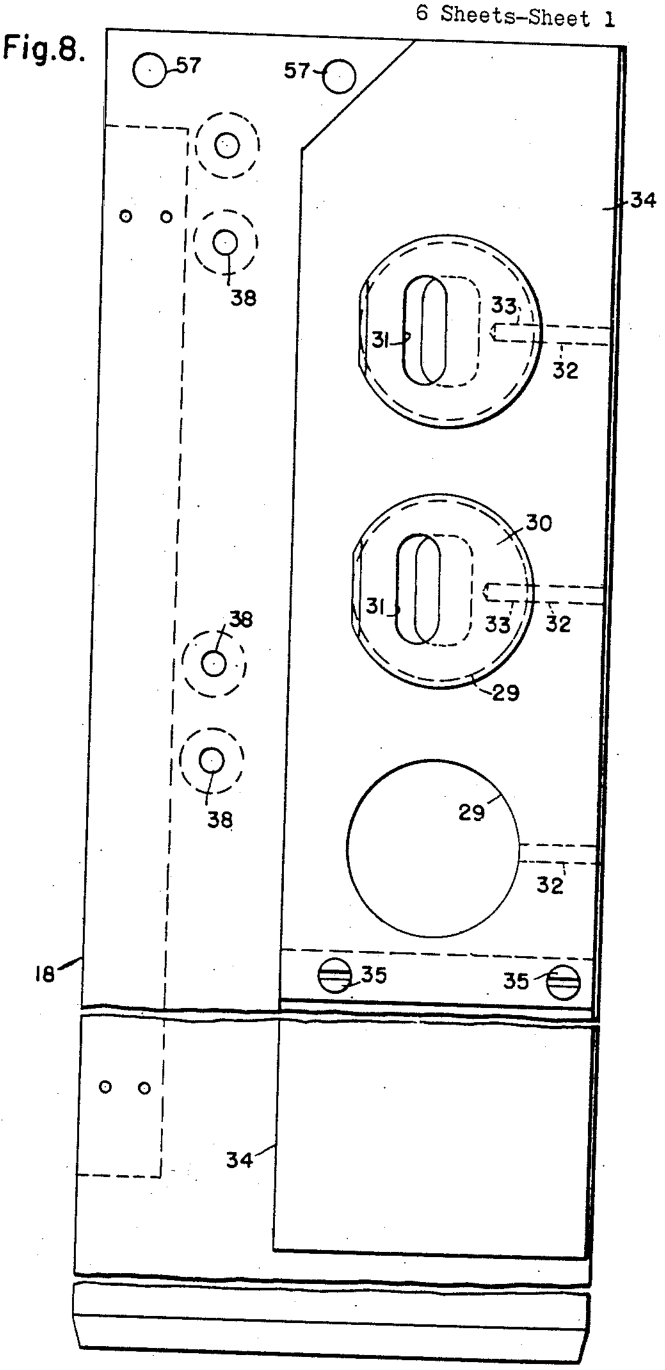
Fig. 8 is a side elevational view, partly broken away, of the medial barrier plate employed in the circuit interrupter shown in Fig. 1.

As more fully shown in Fig. 8 of the drawings, the insulating barrier plate 18 has a plurality, in this particular instance six, openings 29. In each opening is inserted an orifice plug 30 of a suitable insulating material. In the case where sulfur hexafluoride is used as the gas enclosed within the cylinder 4, polytetrafluoroethylene is used for the material constituting the orifice plug 30, inasmuch as this particular material is not readily affected by the arc when drawn in sulfur hexafluoride. Furthermore, it does not contain hydrogen which would lower the dielectric strength of the sulfur hexafluoride if liberated by action of the arc as is the case with many other insulating materials.

As noted in Fig. 8, the orifice plug 30 has an orifice opening 31 provided therein, and dowel openings 32 are provided through the side edge of the baffle 18 and also through a side edge of the orifice plug 30, through which an insulating dowel pin 33 (Fig. 6) may pass to maintain the orifice plug 30 in a fixed position.

Since the baffle plate 18 may be formed of an insulating material which could produce undesirable decomposition products when exposed to an arc drawn in sulfur hexafluoride, preferably a pair of overlapping facing plates 34 are provided, as indicated in Fig. 8, the screws 35 securing the facing plates 34 in overlapping engagement, as shown in Fig. 8. Preferably, the facing plates 34 are of polytetrafluoroethylene, and have openings 29 therein which register with the openings 29 in the baffle plate 18.

Likewise, a portion of the interior of the pressure chamber 23 is covered by a suitable curved facing plate 36 of polytetrafluoroethylene, which is maintained in position by screws 37, as shown more clearly in Fig. 5 of the drawings.

The baffle plate 18 is also provided with a plurality of counterbored mounting apertures 38, through which mounting bolts 39 (Figs. 5 and 6) may extend, which thread into tapped apertures 40 provided in relatively stationary contacts 41. The relatively stationary contacts 41 are, as observed in Fig. 2, mounted upon the insulating baffle plate 18 in spaced relation axially thereon. The relatively stationary contacts 41 are preferably made in casting form having at the ends thereof a pair of inwardly extending contact supporting projections 42 (Fig. 5). A pair of opposed contacts 43, each having two pairs of segmental contact fingers 44 are provided, being biased inwardly by contact leaf springs 45 and are surrounded by a spring retaining clamp 46. One end of the segmental contact fingers 44 engages the projection 42, at each end of the stationary contact casting 41, whereas the other ends of the segmental contact fingers 44 make engagement in the closed-circuit position, as shown in Fig. 5, with one end of a movable U-shaped bridging contact 47, the configuration of which is more readily apparent from an inspection of Figs. 6 and 7 of the drawings.

Figure 7:
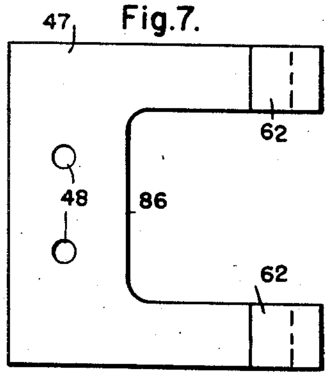
Fig. 7 is a side elevational view of one of the hook-shaped movable bridging contact members utilized in the extinguishing unit of Fig. 1.
Figure 7A:
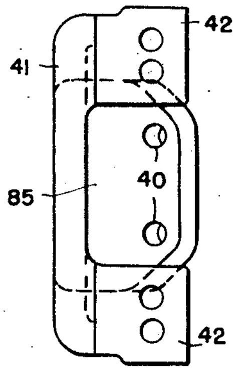
Fig. 7A is an end elevational view of a stationary contact support.

With particular reference to Fig. 7, it will be noted that the U-shaped movable bridging contact 47 has a pair of mounting holes 48 provided therein, which are preferably tapped; and mounting bolts 49 (Fig. 5) pass through a rotatable insulating operating shaft 50 to thread into the tapped apertures 48 of the U-shaped movable bridging contact 47.

Viewing Figs. 2 and 2A collectively, it will be observed that the rotatable insulating operating shaft 50 extends axially lengthwise interiorly of the cylinder 4. The upper end of the insulating shaft 50 has a pivot pin 51 extending therein (Fig. 2), the pivot pin 51 having an upper bearing extension 52 which passes through a bearing opening 53 disposed in a triangularly-shaped metallic mounting plate 54 (Fig. 5). The mounting plate 54 has a pair of mounting pins 55 welded thereto, as at 56 of Fig. 2. The mounting pins 55 extend through apertures 57 (Fig. 8) of the baffle plate 18 and have their extremities threaded to accommodate nuts 58, as more clearly shown in Fig. 5 of the drawings. Thus the upper end of the insulating shaft 50 is guided or journalled in the mounting plate 54 which itself is secured fixedly to the baffle 18. To further locate the bearing plate 54, a pair of metallic dowel pins 59 pass through the apertures 60 in the cover plate 8 and are welded thereto. Thus the dowel pins 22 and 59 accurately locate the upper end of the baffle plate 18 and the bearing plate 54.

Fig. 2 more clearly shows the securement of the U-shaped rotatable bridging contacts 47, which are spaced axially along the insulating shaft 50, in notches 61 provided therealong. It is obvious that rotation of the operating shaft 50, by the rotation of the hexagonal operating shaft 2 by any suitable mechanism, will effect simultaneous rotative motion of the plurality of bridging contacts 47, to effect engagement and disengagement between the tips 62 of the bridging contacts 47 and the outer ends of the segmental fingers 44, as clearly indicated in Fig. 5 of the drawings.

With particular reference to the lower end of Fig. 2A of the drawings, it will be observed that the hexagonal operating shaft 2 is merely an extension of a metallic rod 63, which is journalled in a bushing 64 of cylindrical configuration brazed into position. The bushing 64 may be placed within an opening 65 provided through the lower base plate 9 of the interrupting device 1. The upper end of the shaft 63 has two metallic plates 66 welded thereto, as indicated in Fig. 4. The spaced plates 66 are disposed on opposite sides of the insulating shaft 50, and mounting bolts 67 pass through the spaced plates 66 and through the lower end of the operating shaft 50 therebetween to rigidly secure the insulating operating shaft 50 with the metallic operating shaft 63 having the lower hexagonal portion 2, the latter being coupled to any suitable mechanism.

To prevent the leakage of gas between the shaft 63 and the inner wall of the bushing 64, a U-shaped clamp 68 is provided, clamping a flexible rubber-like sleeve 69 to the lower outside surface 70 of the bushing 64. A clamping bolt 71 preferably passes through the bifurcations of the U-shaped clamp 68 to thereby make a gas-tight seal between the interior of the sleeve 69 and the surface 70 of the bushing 64.

A second U-shaped clamp 72 is provided at the lower end of the sleeve 69 to rigidly clamp the same to the outer surface of the shaft 63 to prevent gas leakage at this point. Consequently, the sleeve 69, which is preferably of a suitable rubber-like material, provides a gas-tight flexible connection between the rod 63 and the base portion 9 of the interrupting unit 1, so that the operating shaft 63 may be rotated by the hexagonal portion 2, causing corresponding rotation of the insulating operating shaft 50, without any gas leakage occurring along the bearing surfaces. The use of such a flexible sleeve 69 is described and claimed in United States patent application filed April 9, 1956, Serial No. 576,875, by Harry J. Lingal, and assigned to the assignee of the instant application.

If desired, a protecting cylindrical rubber boot 73 may be employed externally of the rubber-like sleeve 69, to limit its expansion under internal pressure. Also a bearing housing 74 may be mounted by bolts 75 to the lower side of the base plate 9. The bearing housing 74 has a lower closure plate 76 welded thereto, as at 77, with the closure plate 76 being provided with a bearing opening 78, which serves to provide an additional bearing surface for the operating shaft 63.

From the foregoing description, it will be readily apparent that upon rotation of the operating shaft 63 by a mechanism connected to the hexagonal portion 2 thereof, rotation will be achieved with slight flexing of the sleeve 69. This rotative motion will be transmitted by means of the plates 66 (Fig. 4) to the insulating operating shaft 50, which will thereupon rotate to effect simultaneous separation of the several movable contact tips 62 from the segmental fingers 44 of the relatively stationary contacts 43. The arcs will be drawn through the orifices 31 provided in the several orifice plugs 30, and the increased pressure of the gas set up within the pressure chamber 23, by the establishment of the several arcs initially within this chamber 23, will cause a flow of gas out of the chamber 23 into the exhaust chamber 24 through the several orifice openings 31, effecting rapid extinguishment of the arcs.

As indicated in Figs. 2 and 2A, the lower set of segmental fingers 44 are turned at right angles and instead of making contact with a movable contact 62, make engagement with a conducting projection 79, secured to the inner side of the cylinder 4. A conducting terminal rod 80 is encircled by an insulating sleeve 81 which threads into the cylinder 4 at 82, as shown in Fig. 5. Thus the terminal rod 80 (Fig. 5) is directly connected by the segmental fingers 44 to the lowermost stationary contact casting 41, as is indicated in Fig. 2 of the drawings. The upper terminal of the device is indicated at 83 in Fig. 1, and may consist of a stud threaded through the top cover plate 8 and having a lower plate portion 84 (Fig. 5) welded thereto, which may be disposed between the base 85 of the top stationary contact 41 and the nut 58a of the mounting screw 39 therefor.

The electrical circuit thus extends from the mounting stud 83 (Fig. 1) directly to the upper stationary contact casting 41, to the uppermost movable contact tip 62, thence through the bight portion 86 of the bridging contact 47. The circuit then extends through the lower movable tip portion 62 to the contact fingers 44 at the upper end of the second relatively stationary contact casting 41, through the contact casting 41 to the upper tip portion 62 of the second bridging contact 47. The circuit then zigzags downwardly in an obvious manner to the lowermost contact fingers 44, which, as mentioned, and as shown in Fig. 2, are turned 90° to engage the projection 79 which is in electrical contact with the terminal rod 80, as indicated in Figs. 2A and 5.

From the foregoing, it will be apparent that I have provided a plurility of serially related breaks in a compact arrangement within a cylindrical tube 4, wherein the rotation of a single shaft 50 effects contact engagement and disengagement. The pressure set up within the pressure chamber 23 is effectively utilized to force the gas through the orifice openings 31 and into engagement with the several serially related arcs, which are simultaneously drawn.

Experimental tests have demonstrated the excellent performance of a gas-filled switch using, for instance, sulfur hexafluoride at 1 to 3 atmospheres pressure for deenergizing large capacitor banks without arc restriking. The foregoing structure discloses a multibreak design for such possible duty. It will be noted that the simple multiple contact gaps open at high speed and bring about fast arc interruption. When the contacts 62 pull through the orifices 31, and heated gas on one side of the baffle 18 creates a flow through these orifices 31, rapid arc extinguishment is possible. The foregoing structure is a multibreak interrupter arranged so that rotation of a shaft 50 pulls a group of serially connected contacts 62 through orifices 31 in a central baffle plate 18.

For grading the voltage equally between the breaks, a resistor tube 87 may be employed, which encloses a plurality of resistor blocks 88 which may be of a suitable carbon-impregnated material. Suitable connections not shown may be employed to connect the stationary contact castings 41 with portions of the resistor tube 87 for equal voltage gradation in a manner well known in the art. Capacitance units may be used to advantage in place of the resistor blocks as voltage dividers, particularly, where disconnect switches are not operated promptly to cut off the residual current through the resistors after the switch has been opened.

Figure 9:
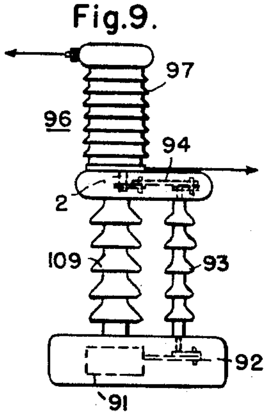
Fig. 9 is a somewhat diagrammatic view illustrating a complete circuit interrupter, together with the mechanism therefor, incorporating the principles of my invention.

Fig. 9 diagrammatically illustrates a complete circuit interrupter for housing and operating the interrupting device 1. Here a mechanism 91 is diagrammatically indicated at ground potential, which will effect through the linkage 92 rotation of an insulator column 93. The upper end of the rotatable insulating column 93 may be linked, as at 94, to the lower end of the shaft 2. A porcelain cylinder 97 provides a weatherproof enclosure for the interrupting device 1 and is spaced above ground potential.

Fig. 10 illustrates a fragmentary enlarged portion of the lower end of a modified type of interrupting unit 96, which may be substituted for the interrupting device 1 in Fig. 9. As indicated in Figs. 10 and 11, the interrupting unit 96 includes the enclosing weatherproof casing 97 of porcelain, or the like, interiorly of which is disposed an insulating tube 98. The lower end of the tube 98 may be secured interiorly of an upstanding circular flange portion 99 of a base plate 100 by means of screws 101. The same screws 101, together with other mounting screws 102, may be used to secure stationary substantially M-shaped bridging contacts 103 in position, as shown in Fig. 10.

Movable contact blades 104 spaced along an insulating shaft 105 by insulating spacing sleeves 106 are provided to interconnect the inturned contact portions 107. It will be observed that during the passage of heavy current through the device, the magnetic forces will tend to expand the loop defined by the inturned stationary contact portions 107 so that a higher contact pressure exists during such conditions between the contact portions 107 and the bridging movable blades 104.

Fig. 11 shows the structure in the closed position where the several blades 104 bridge the stationary substantially M-shaped contact structures 103. The dotted lines 108 indicate the fully open-circuit position of the device, wherein the insulating operating shaft 105 has been rotated to the open position by the mechanism 91.

Switching of high-voltage capacitor banks without delayed restriking of the arc (which causes objectionable current and voltage surges) has been found to be very difficult with conventional circuit breakers. The devices set out in Figs. 1 and 9–11 cover low-cost, but highly effective, switches, which may be used for capacitor switching. These devices 1, 96 have relatively low short-circuit clearing ability, since short-circuit currents would normally be handled by a separate power breaker or a fuse.

As shown in Fig. 10, a series of flexible contacts 103 are mounted along the length of the insulating tube 98 to provide a number of series gaps, say, for example, one gap for each 10 to 20 kv. of voltage rating. The bridging contact bars 104 are spaced along the insulating operating rod 105 and can be rotated into the contact gaps completing the electrical circuit from top to bottom of the tube 98. Preferably, the tube 98 is filled with a gas under pressure, for example, sulfur hexafluoride at 10 to 50 pounds per square inch, which is very effective in opening low current alternating-current arcs without restriking. As mentioned, Fig. 9 shows a general view of a complete pole unit on an insulating column 109 having a rotatable insulator column 93, which rotates to operate the contacts from a conventional mechanism at ground potential. Preferably, one-piece cast fingers 103 of a suitable metallic material are used for low cost and momentary current carrying ability, with the configuration thereof so arranged that increased contact pressure is obtained during the passage of high currents through the device. If desired, a resistor or capacitor tube 110 may be employed to shunt the various gaps to equally distribute the voltage thereacross during the interrupting operation.

Fig. 12 is a schematic diagram illustrating the importance of providing a capacitor switching device, which will quickly interrupt the circuit without restriking. A portion of the diagram for simplicity has been shown as a single-line diagram, wherein the generators 111 are connected by power circuit breakers 112 to a bus 113. The bus 113 is connected to a transformer 114, stepping up the voltage with a power breaker 115 interposed between the transformer 114 and the bus 113. On the high-voltage side of the transformer 114 is a high-voltage power breaker 116 connecting the transformer 114 to the high-voltage bus 117.

From the high-voltage bus 117, various transmission lines may lead in different directions, being protected by circuit breakers 118, 119. The transmission line 127, on the right-hand side of the diagram of Fig. 12, has been shown as a three-line diagram to more clearly show the connections to the capacitor banks or sections 120, 121, 122. An interrupter 1, 96, such as described hereinbefore, may be utilized to effect switching of the capacitor banks 120–122, wherein a plurality of such interrupters 1 may be employed, as indicated. A power circuit breaker 123 may be employed to protect the entire bank, and also to effect switching in the first section of the bank 122.

The substation bus bars are indicated by the reference characters 124, 125, 126, and they are connected to the three-phase transmission line 127 by the breakers 128. The three phases **127*a*, 127*b* and 127*c* are connected by the three single pole breakers 128 to the station buses 124, 125, 126, and thence through a three-phase power circuit breaker 129 to a step-down transformer 130. The low-voltage side of the step-down transformer 130 is connected by the power circuit breaker 131** to the load, as indicated.

For a particular application, the length of the transmission line may be from 25 to 100 miles long. The voltage on the line 127 may vary, say from 33 to 132 kv., and the three-phase capacitor banks 120, 121, 122, in three sections may, for example, have a kvar. rating of from 5,000 to 50,000. The foregoing example is merely given by way of illustration and, of course, I am not limited to such values or the particular application, the foregoing merely being a possible application of my invention.

The power capacitor banks 120, 121, 122 are provided, as well known to those skilled in the art, for power-factor correction, and also for voltage control. The amount of power factor correction will, of course, depend upon the particular load being carried. For a particular load, it may be desirable to have only section I, or the power capacitor bank 122, and this can be brought into service by closing of the power breaker 123, with the capacitor switches 1 of the banks 120 and 121 remaining open. If additional load is carried, it may be desirable to switch in section II, or the capacitor bank 121, and the capacitor switches which control bank 121 may be closed. Additional loading may require the closing of the switches 1 of section III, or bank 120.

Should the load conditions require removal of section III, it will be necessary to open the switches 1 connected to capacitors 120. An arc is formed at the separating contacts until the current comes to a normal zero. At this instant, the capacitors are left fully charged to the crest of the line-to-ground bus voltage, and since no difference of potential exists across the contacts, the arc does not reignite. The charge of the isolated capacitors 120 is maintained nearly constant while the bus voltage changes polarity at normal power frequency so that a difference of potential builds up across the switch to a maximum of double line-to-ground crest volts in a period of one-half cycle. If during this time the arc should restrike across the switches 1 of section III, it will be obvious that the surge current between sections II and III will be very large since their amplitude will be limited only by the surge impedance between the sections, which may be relatively low. Surge currents several hundred times normal load value oscillating at frequencies more than a hundred times system frequency have been observed. Thus arc restriking is very undesirable under such circumstances since heavy surge currents are permitted to oscillate between the sections of the capacitor bank, and the capacitors may be damaged thereby. Where restrikes have occurred in oil switches used for capacitor bank sectionalizing, instances are known of pressure shocks under oil resulting in extensive damage to the interrupting chambers and other parts of the switches.

From the foregoing illustrative example of a possible application for my interrupting device, it will be readily apparent that since arc restriking is very undesirable, by the provision of a plurality of serially related breaks in the manner disclosed, a circuit interrupter results, which has particularly advantageous use in the control of capacitor banks. Although such a use has been suggested, it is obvious that the circuit interrupter may have other uses, and is so designed to have considerable load and overload interrupting ability.

The use of sulfur hexafluoride gas as an arc-extinguishing gas is set out and claimed in United States patent application filed July 19, 1951, Serial No. 237,502, now United States Patent 2,757,261, issued July 31, 1956, to Harry J. Lingal, Thomas E. Browne, Jr., and Albert P. Strom, and is assigned to the assignee of the instant application. This patent also covers the use of polytetrafluoroethylene when used in a circuit interrupter employing sulfur hexafluoride gas.

Although I have shown and described specific structures, it is to be clearly understood that the same were merely for the purpose of illustration, and that changes and modifications may be readily made therein by those skilled in the art without departing from the spirit and scope of the invention.

I claim as my invention:

1. A circuit interrupter including a tubular insulating casing, an insulating rod rotatable within the casing and carrying a plurality of spaced movable bridging contacts therewith, a plurality of spaced relatively stationary contact structures mounted longitudinally along the casing, rotation of the insulating rod causing engagement and disengagement of the contacts, insulating means for spacing the insulating casing away from ground potential, means for actuating the insulating rod from the lower end of the casing, and the casing containing sulfur hexafluoride gas.

2. The combination in a circuit interrupter of a tubular insulating gas-tight casing, a plurality of spaced movable bridging contacts, an operating rod projecting downwardly from the casing for causing rotation of the movable bridging contacts, a plurality of spaced relatively stationary contact structures mounted longitudinally along the casing, insulating means mounting the insulating casing above ground potential, operating means at ground potential for causing rotation of the operating rod, and said gas-tight casing containing sulfur hexafluoride gas.

3. A circuit interrupter including a weatherproof casing, an insulating casing disposed interiorly within the weatherproof casing, a plurality of spaced movable bridging contacts, an operating rod projecting downwardly from the casing for causing rotation of the movable bridging contacts, a plurality of spaced relatively stationary contact structures mounted longitudinally along the casing, insulating means spacing the insulating casing above ground potential, and a rotatable insulator column separate from said weatherproof casing for causing rotation of the operating rod.

4. A circuit interrupter including a weatherproof casing, an insulating gas-tight casing disposed interiorly within the weatherproof casing, a plurality of spaced movable bridging contacts, an operating rod projecting downwardly from the casing for causing rotation of the movable bridging contacts, a plurality of spaced relatively stationary contact structures mounted longitudinally along the casing, insulating means mounting the insulating casing above ground potential, a rotatable insulator column separate from the aforesaid weatherproof casing for causing rotation of the operating rod, and said gas-tight casing containing sulfur hexafluoride gas.

5. A circuit interrupter including a tubular member having a partition plate diametrically positioned therein and extending longitudinally thereof with a plurality of orifice openings therethrough, said longitudinally extending partition plate dividing said tubular member into a pressure-generating chamber and an interrupting chamber, means providing a zig-zag current path along the partition plate on both sides thereof, and a plurality of arcs being drawn through the orifice openings during the opening operation.

6. The combination in a circuit interrupter of a casing, a baffle plate having a plurality of orifice openings therein dividing the casing into a pressure chamber and an exhaust chamber, a plurality of movable contacts, rotatable means for moving the movable contacts through the orifice openings, and a plurality of relatively stationary contact structures mounted along the baffle plate.

7. The combination in a circuit interrupter of a casing, a baffle plate having a plurality of orifice openings therein dividing the casing into a pressure chamber and an exhaust chamber, a rotatable rod carrying a plurality of movable contacts and disposed in the exhaust chamber, a plurality of spaced stationary contact structures mounted on the baffle plate in the pressure chamber, and a plurality of arcs being drawn adjacent the orifice openings during the opening operation.

8. The combination in a circuit interrupter of a casing, a baffle plate having a plurality of orifice openings dividing the casing into a pressure chamber and an exhaust chamber, a plurality of spaced relatively stationary contact structures mounted within the pressure chamber, a plurality of movable contacts, rotatable means for simultaneously moving the plurality of movable contacts adjacent the orifice openings, and a plurality of serially related arcs being drawn adjacent the orifice openings during the opening operation.

9. The combination in a circuit interrupter of a casing, a baffle plate having a plurality of orifice openings dividing the casing into a pressure chamber and an exhaust chamber, a plurality of spaced relatively stationary contact structures mounted within the pressure chamber, a plurality of movable U-shaped bridging contacts, rotatable rod means carrying the U-shaped bridging contacts and causing their motion through the orifice openings into engagement with the relatively stationary contact structures to provide a zigzag current path through the interrupter.

10. A circuit interrupter including a tubular insulating casing, a baffle plate extending longitudinally within the casing dividing the same into a pressure chamber and an exhaust chamber, an insulating operating rod rotatable within the exhaust chamber and carrying a plurality of U-shaped bridging contacts, a plurality of relatively stationary contact structures mounted on the plate in spaced relation, a plurality of orifice openings in the baffle plate adjacent the relatively stationary contact structures, and rotation of the rod drawing a plurality of arcs through the orifice openings to effect the interrupter thereof.

References Cited in the file of this patent

UNITED STATES PATENTS

| | | |
|---|---|---|
| 943,215 | Carrigan et al. | Dec. 14, 1909 |
| 1,748,724 | Morger | Feb. 25, 1930 |
| 1,946,504 | Sachs | Feb. 13, 1934 |
| 2,223,901 | Scarpa | Dec. 3, 1940 |
| 2,467,788 | Van Sickle | Apr. 19, 1949 |
| 2,616,006 | Frink | Oct. 28, 1952 |